United States Patent [19]

Cotreau

[11] 4,193,325

[45] Mar. 18, 1980

[54] GEAR BOX

[76] Inventor: Alexander P. Cotreau, 21 Peach Orchard Rd., Burlington, Mass. 01803

[21] Appl. No.: 849,887

[22] Filed: Nov. 9, 1977

[51] Int. Cl.² .............................................. F16H 1/28
[52] U.S. Cl. ...................................... 74/801; 74/750 R
[58] Field of Search ............. 74/409, 410, 411, 750 R, 74/752 B, 392, 801, 751, 752 F; 308/231, 189, 163, 176

[56] References Cited

U.S. PATENT DOCUMENTS

| | | | |
|---|---|---|---|
| 2,469,905 | 5/1949 | Tatlow | 74/801 |
| 2,591,967 | 4/1952 | Ridgely et al. | 74/801 |
| 3,943,780 | 3/1976 | Klaue | 74/801 X |
| 4,106,366 | 8/1978 | Altenbokum et al. | 74/801 |

*Primary Examiner*—C. J. Husar
*Assistant Examiner*—Frank McKenzie

[57] ABSTRACT

A speed reducing gear box of the type including, for each reducing stage, a plurality of planetary gears revolving about a central sun gear and inside an internal gear, the improvement of axially loading the planetary gears to provide sufficient friction to retard ballotting of said gears but not to substantially reduce power transmission of said gear box and to allow use of a tighter planetary gear mesh to decrease angular transmission errors.

7 Claims, 1 Drawing Figure

U.S. Patent
Mar. 18, 1980
4,193,325
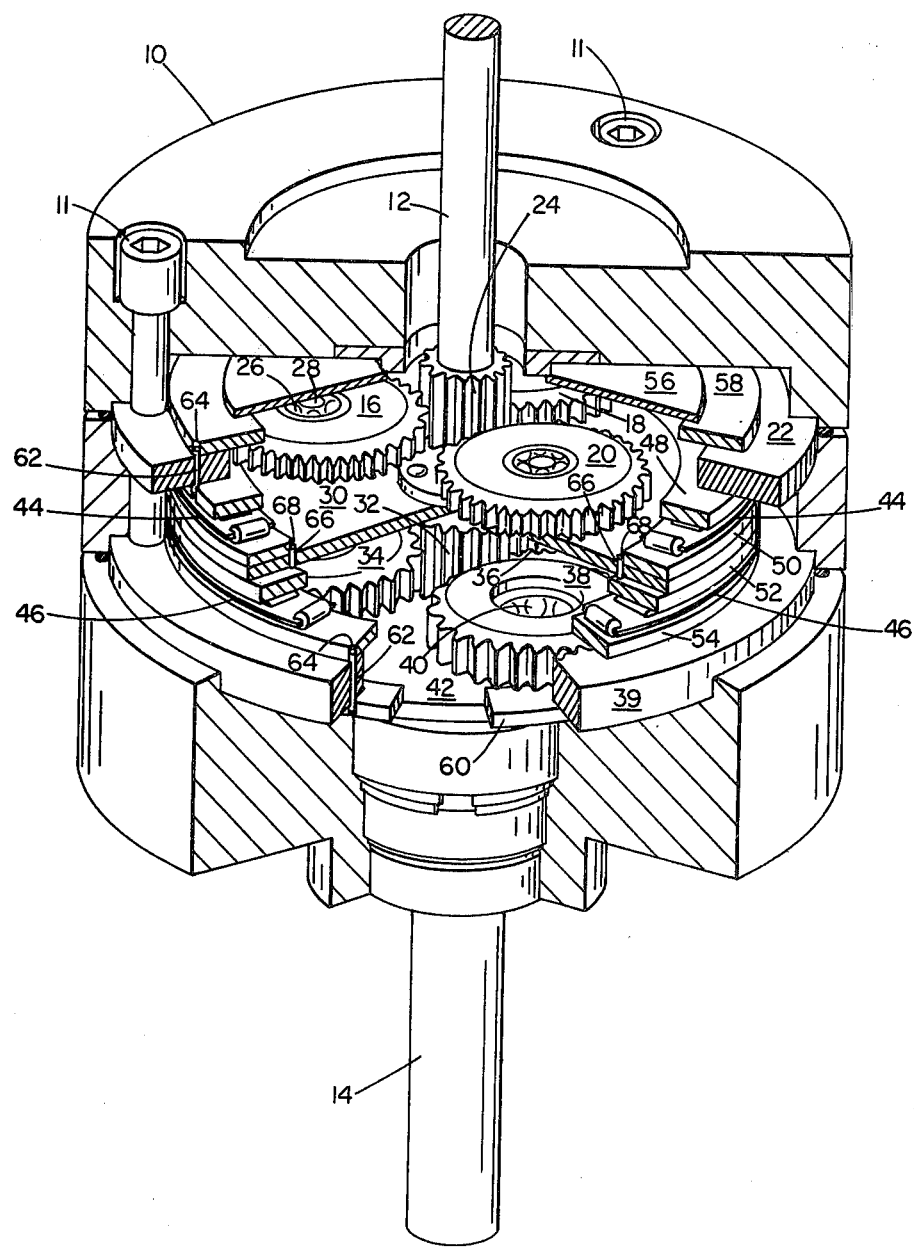

GEAR BOX

BACKGROUND OF THE INVENTION

Although speed reducing gear boxes employing planetary gear systems have long been known, they have generally suffered from gear chattering or balloting on stopping or starting, owing to the inertial resistance of individual gears to changes in speed, as well as from unequal loading of their many gears, leading to shortened operating life. Ballotting is a particularly acute problem in stepping motor applications, in which frequent stops and starts are routine. It can cause premature gear failure due to vibration fatigue, as well as undesirably noisy operation.

Accuracy limitations of planetary gear boxes have also limited their application to stepping motors. Small individual gear inaccuracies, principally due to eccentricity, and less important in continuous rotation applications, can cause significant angular errors in the output of a stepping motor. The cumulative angular error resulting from the numerous gear meshes between input and output is a further limitation.

SUMMARY OF THE INVENTION

I have discovered that by axially loading the planetary gears of a speed reducing gear box sufficient friction can be applied to substantially reduce ballotting without significantly increasing frictional losses in power transmission. Axial loading further allows use of a tighter planetary gear mesh, without the usual cogging effects (jumping action in tightly meshed gears), thereby decreasing angular transmission errors of the gear box.

In the preferred embodiment, a two stage reducer, the axial load is applied to both sides of the peripheries of the planetary gears by means of spring loaded thrust washers, which rest partially against both the internal gears and engaged portions of the planetary gears. This preferred axial loading arrangement further allows using axial thrust bearings to support the immediate carrier plate, allowing it to float radially and thereby both average out troublesome individual gear inaccuracies and equalize gear tooth loading.

The improved speed reducing gear box exhibits increased operating life, quieter operation, and improved angular accuracy, all with simple, rugged construction.

DESCRIPTION OF THE EMBODIMENT

The structure and operation of the preferred embodiment of the invention follow:

Structure

The drawing shows the preferred embodiment, which is then described.

1. Drawing

The FIGURE is an isometric view, partially cut away, of said embodiment.

2. Description

Shown in the FIGURE is a two-stage speed reducing gear box, particularly well suited for stepping motor applications. Inside housing 10 (5 inch diameter; 4¼ inch high), composed of three sections longitudinally joined by screws 11, are two planetary gear stages connecting input shaft 12 to output shaft 14. The upper stage has planetary gears 16, 18, and 20, internal gear 22, and sun gear 24. The planetary gears rotate about radial ball bearings 26 on pins 28 extending upwardly from intermediate carrier plate 30. The lower sun gear 32 is fixed to the underside of carrier 30. The lower planetary gears 34, 36, 38 are engaged with lower internal gear 39 and rotate about radial ball bearings 40 on pins (hidden from view) extending upwardly from lower carrier plate 42 fixed to output shaft 14. Intermediate carrier 30 is supported above and below by thrust needle bearings 44, 46 between thrust washers 48, 50, 52, 54. Belleville spring 56 (I.D. 1¼ inch; O.D. 3⅛ inch; 0.050 inch thick) and upper and lower thrust washers 58, 60 complete the vertical stack. To secure thrust washers 58, 60, 48, 54 from rotation and radial motion, pins 62, one extending through each internal gear 22, 39, are received in notches 64 on the outside of the thrust washers, and screws 11 abut the outside of the washers. For similar purposes, three pins 66 extend through inetermediate carrier plate 30 into notches 68 on the inside surfaces of thrust washers 50, 52.

Operation

The gear box converts input rotary motion of shaft 12 at high speed (and low torque) to output motion of shaft 14 at low speed (and high torque). As is well known, starting and stopping the rotary motion of such multi-gear devices causes ballotting or chattering of the gears as the inertia of individual gears causes them to lag or lead gears with which they are meshed.

To retard ballotting each planetary gear is axially loaded between pairs of thrust washers: upper planetary gears 16, 18, 20 between washers 58, 48; lower gears 34, 36, 38 between washers 54, 60. All the thrust washers and the two internal gears are axially compressed (20 lb.) by Belleville spring 56 against a step (not shown) in the housing below lowermost thrust washer 60. In this manner portions of the outer surfaces of each planetary gear make intermittent frictional contact with the thrust washers as they engage the internal gear. Enough friction is supplied to retard the inertial forces of the gears, but not so much as to substantially resist the much larger rotational operating torques. The 20 lb. axial load increases the input torque required from about 2 inch-oz. to 10 inch-oz., while the device is capable of a 500 inch-lb. operating (output) torque and conventional stepping motors for which this embodiment is designed are capable of supplying 400 inch-lb. input torque.

Axial loading is also provided to needle bearings 44, 46 by Belleville spring 56, thereby allowing intermediate carrier plate 30 to float radially, resisted only by the radial sliding friction of needle bearings 44, 46 against thrust washwers 48, 50, 52, 54. Carrier float principally compensates for the lack of concentricity, or eccentricity, in the various gears. With a rigid carrier one planetary gear in each stage would carry the load, and the amount of angular error, or backlash, in a stage would similarly vary as the loaded gear rotated between a tightly meshed condition and a loosely meshed one, error being at a maximum during the latter condition. The small radial motions of the carrier allowed by the floating design substantially equalize the gear loading, thus lengthening gear life, and average out the angular errors of each gear, thus resulting in a reduction in the maximum angular error.

OTHER EMBODIMENTS

Other embodiments of the invention are within the scope of the description and claims. For example, axial loading of the planetary gears could be achieved by substituting for the Belleville spring a series of individual coil springs around and directly overhead the upper thrust washer. Such a configuration has the advantage of providing enhanced uniformity of input torque.

What is claimed is:

1. In a speed reducing gear box of the type including, for each reducing stage, a plurality of planetary gears revolving about a central sun gear and inside an internal gear, the improvement comprising means to axially load the planetary gears to provide sufficient friction to retard ballotting of said gears but not to substantially reduce power transmission of said gear box, wherein the means to axially load the planetary gears provides an axial load on that portion of said planetary gears engaged with said internal gear.

2. In a speed reducing gear box of the type including, for each reducing stage, a plurality of planetary gears revolving about a central sun gear and inside an internal gear, the improvement comprising means to axially load the planetary gears to provide sufficient friction to retard ballotting of said gears but not to substantially reduce power transmission of said gear box, wherein there are at least two reducing stages and at least one intermediate carrier plate, said plate being supported between axial thrust bearings, said means to axially load the planetary gears further providing an axial load to said axial thrust bearings, thereby allowing said carrier plate to float radially, constrained only by frictional forces imparted by said axial loading, resulting in more equalized tooth loading and averaging of said individual gear inaccuracies.

3. In a speed reducing gear box of the type including, for each reducing stage, a plurality of planetary gears revolving about a central sun gear and inside an internal gear, the improvement comprising means to axially load the planetary gears to provide sufficient friction to retard ballotting of said gears but not to substantially reduce power transmission of said gear box, wherein the axial load is applied to each said planetary gear in a given reducing stage by a pair of opposed thrust washers bearing against both sides of each said planetary gear in said stage.

4. The gear box of claim 3 wherein the axial load is provided to said thrust wahsers by at least one Belleville spring.

5. The gear box of claim 3 wherein said pair of thrust washers are substantially concentric with said internal gear and rest partially on both the toothed region of said internal gear and the portion of said planetary gears engaged with said internal gear.

6. The gear box of claim 5 wherein there are at least two reducing stages and at least one intermediate carrier plate, the further improvement comprising supporting said plate between axial thrust bearings radially aligned with said thrust washers and axially compressed by said Belleville spring, thereby allowing said carrier plate to float radially, constrained only by frictional forces imparted by said axial loading, resulting in more equalized tooth loading and averaging of individual gear inaccuracies.

7. The gear box of claim 6, wherein said axial thrust bearing includes on both sides of said carrier plate a plurality of needle bearings disposed between pairs of thrust washers.

* * * * *